US009357454B2

(12) United States Patent
Hansson et al.

(10) Patent No.: US 9,357,454 B2
(45) Date of Patent: May 31, 2016

(54) METHODS, USER EQUIPMENT AND BASE STATION FOR SUPPORTING UPDATE OF NEIGHBOUR CELL RELATIONS IN A CELLULAR COMMUNICATIONS NETWORK

(75) Inventors: Elisabeth Hansson, Linköping (SE); Tobias Ahlström, Ljungsbro (SE); Stefan Engström, Linköping (SE); Johan Moe, Mantorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/412,741

(22) PCT Filed: Jul. 10, 2012

(86) PCT No.: PCT/SE2012/050819
§ 371 (c)(1),
(2), (4) Date: Jan. 5, 2015

(87) PCT Pub. No.: WO2014/011091
PCT Pub. Date: Jan. 16, 2014

(65) Prior Publication Data
US 2015/0148042 A1 May 28, 2015

(51) Int. Cl.
*H04W 36/00* (2009.01)
(52) U.S. Cl.
CPC ...... *H04W 36/0088* (2013.01); *H04W 36/0083* (2013.01)
(58) Field of Classification Search
CPC .............. H04W 36/00; H04W 36/005; H04W 36/0011; H04W 36/0027; H04W 36/0055; H04W 36/0061; H04W 36/0066; H04W 36/0083; H04W 36/0088; H04W 36/0094; H04W 48/20; H04W 48/00
USPC ............... 455/436, 437, 438, 439, 442, 422.1
See application file for complete search history.

(56) References Cited

U.S. PATENT DOCUMENTS 8,380,196 B2 * 2/2013 Racz ................. H04W 36/0072 455/436
8,818,371 B2 * 8/2014 Watanabe ............ H04W 24/10 370/331

(Continued)

FOREIGN PATENT DOCUMENTS

WO WO 2009/009498 1/2009
WO 2009064716 A1 5/2009

(Continued)

OTHER PUBLICATIONS

PCT/CN2011/072955 by Liang et al., published on Nov. 3, 2011.*
Office action received in EP application No. 12881062.9 mailed Jun. 22, 2015, pp. 8.
PCT International Search Report for International application No. PCT/SE2012/050819, Jun. 28, 2013.

(Continued)

*Primary Examiner* — Siu Lee
(74) *Attorney, Agent, or Firm* — Patent Portfolio Builders, PLLC

(57) ABSTRACT

Methods, user equipment (120) and target base station (130) for supporting update of neighbor cell relations in a cellular communications network (100). The user equipment (120) switches from being served in the source cell (115) by the source base station (110) to instead being served in the target cell (135) by the target base station. The user equipment sends (304, 403), to the target base station (130), in association with the switching, an identifier of the source cell (115) in the cellular communications network (100) and a request for mobility report. The request for mobility report requests the target base station (130) to send a mobility report to the source base station (110) or a management entity (140) thereof. The mobility report reporting that a successful switch has taken place between the source cell (115) and the target cell (135), thereby enabling updating of the neighbor cell relations based on the mobility report. Hence, reporting back of successful cell switching is enabled even when the target base station is unprepared by the source base station about the switching. Neighbor cell relations of at least the source base station may be updated based on the mobility report.

14 Claims, 7 Drawing Sheets

(56) References Cited

U.S. PATENT DOCUMENTS

| | | | | |
|---|---|---|---|---|
| 8,953,643 B2* | 2/2015 | Liang | ............... | H04W 36/30 370/329 |
| 8,964,693 B2* | 2/2015 | Gao | ............... | H04W 24/02 370/331 |
| 8,983,469 B2* | 3/2015 | He | ............... | H04W 36/0083 455/432.1 |
| 2009/0270079 A1* | 10/2009 | Han | ............... | H04W 36/0061 455/414.1 |
| 2013/0295915 A1* | 11/2013 | Nakamata | ......... | H04W 36/0061 455/422.1 |

FOREIGN PATENT DOCUMENTS

| | | |
|---|---|---|
| WO | WO 2010/104143 | 9/2010 |
| WO | WO 2011/016173 | 2/2011 |
| WO | WO 2011/042433 | 4/2011 |
| WO | 2011139855 A1 | 11/2011 |
| WO | WO 2012/019994 | 2/2012 |

OTHER PUBLICATIONS

PCT Written Opinion of the International Searching Authority for International application No. PCT/SE2012/050819, Jun. 27, 2013.

3GPP TS 36.300 V11.1.0 (Mar. 2012) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 2012.

3GPP TS 36.331 V10.5.0 (Mar. 2012) 3rd Generation Partnership Project; Technical Specification Group Radio Access Network; Evolved Universal Terrestrial Radio Access (E-UTRA); Radio Resource Control (RRC); Protocol specification (Release 10), 2012.

3GPP TS 36.423 V11.0.0 (Mar. 2012) 3rd Generation Partnership Project; Technical Specification Group Radio Access Network; Evolved Universal Terrestrial Radio Access Network (E-UTRAN); X2 application protocol (X2AP) (Release 11), 2012.

Office action received in EP application No. 12881062.9 mailed Oct. 29, 2015.

* cited by examiner

METHODS, USER EQUIPMENT AND BASE STATION FOR SUPPORTING UPDATE OF NEIGHBOUR CELL RELATIONS IN A CELLULAR COMMUNICATIONS NETWORK

PRIORITY

This nonprovisional application is a U.S. National Stage Filing under 35 U.S.C. §371 of International Patent Application Serial No. PCT/SE2012/050819, filed Jul. 10, 2012 and entitled "METHODS, USER EQUIPMENT AND BASE STATION FOR SUPPORTING UPDATE OF NEIGHBOUR CELL RELATIONS IN A CELLULAR COMMUNICATIONS NETWORK."

TECHNICAL FIELD

Embodiments herein relate to a respective method in a user equipment and in a target base station serving a target cell for the user equipment. Embodiments herein also relate to the user equipment and the target base station, respectively. In particular, embodiments herein relate to supporting update of neighbour cell relations in a cellular communications network.

BACKGROUND

Communication devices such as User Equipments (UE) are also known as e.g. mobile terminals, wireless terminals and/or mobile stations. A user equipment is enabled to communicate wirelessly in a cellular communications network, wireless communications system, or radio communications system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

The user equipment may further be referred to as a mobile telephone, cellular telephone, laptop, Personal Digital Assistant (PDA), tablet computer, surf plate, just to mention some further examples. The user equipment in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. By the base station serving a cell is meant that the radio coverage is provided such that one or many user equipments located in the geographical area where the radio coverage is provided may be served by the base station. One base station, situated on the base station site, may serve one or several cells. Further, each base station may support one or several communication technologies. The base stations communicate over the air interface operating on radio frequencies with the user equipment within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

In 3rd Generation Partnership Project (3GPP) Long Term Evolution (LTE), base stations, which may be referred to as eNodeBs or eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies, for example into evolved UTRAN (E-UTRAN) used in LTE.

In the context of this disclosure, the expression downlink (DL) is used for the transmission path from the base station to the user equipment. The expression uplink (UL) is used for the transmission path in the opposite direction i.e. from the user equipment to the base station.

In cellular communications network as described above it is fundamental that it is supported that an active and connected user equipment when moving may switch from being served in one cell to instead be served in another cell. This may in general be referred to as mobility.

It is preferred that the switching from one serving cell to another does not negatively affect services provided to the user equipment in the cellular communications network, or at least that any degradation is not resulting in a negative user experience. Hence, it is in general desirable to facilitate cell switching. Today numerous different solutions and concepts exist for this. One such concept is Neighbour cell Relations (NR). In general, NR is about keeping track of relations to neighbour cells for a cell. A neighbour cell here refer to a cell that is so close that it may be expected that a moving user equipment will switch to the neighbour cell when moving. Typically this means that the neighbour cell has overlapping radio coverage with the cell of which it is neighbour. With NR associated with a source cell serving a user equipment, the source base station may have information available, which information may facilitate switching to a neighbour cell where the user equipment is suitably served next. Such neighbour cell may be referred to as target cell.

For cellular communication networks in general, but in particular for networks of today, such as LTE networks, with a great amount of neighbour cells, it is desirable not only to update the NR by adding new neighbour cell relations, but also to maintain and update the NR regarding already added cell relations, e.g. to change priority among existing cell relations and to remove cell relations.

Switching of a user equipment from being served in a source cell by a source base station to instead being served in a target cell by a target base station, may involve that the source base station communicates with and prepares the target base station about the switching. This may be referred to as prepared mobility, or handover, referring to handover of the user equipment by and from the source base station to the target base station. In case of prepared mobility, the target base station typically report back a successful switch to the source base station and NR may be updated accordingly.

However, switching of the user equipment from being served in the source cell to instead being served in the target cell may also be carried out without the above-described preparation of the target base station. This may be referred to as unprepared mobility. It is desirable to be able to update the NR in view of the result of the cell switching also in such cases. However, a successful switch is not to be identified until the switching is complete, when the user equipment is being served in the target cell. However, at this point in time and in the case of unprepared mobility, there is no reporting of the successful switch for updating the NR of the source cell.

SUMMARY

Hence, in view of the above, an object of embodiments herein is to overcome, or at least alleviate, problems in the prior art, or to present an alternative solution. More specifically the object is to support update of neighbour cell relations when a user equipment switches from a source cell to a target cell, particularly in a situation when a target base station serving the target cell is not prepared about the switching by a source base station serving the source cell.

According to a first aspect of embodiments herein, the object is achieved by a method in a user equipment for supporting update of neighbour cell relations in a cellular communications network. The cellular communications network comprises the user equipment, a source cell and a target cell for the user equipment, a source base station serving the source cell, and a target base station serving the target cell. The user equipment switches from being served in the source cell by the source base station to instead being served in the target cell by the target base station. The user equipment sends, to the target base station, in association with the switching, an identifier of the source cell in the cellular communications network and a request for mobility report. The request for mobility report requests the target base station to send a mobility report to the source base station or a management entity thereof. The mobility report reporting that a successful switch has taken place between the source cell and the target cell, thereby supporting update of the neighbour cell relations based on the mobility report.

According to a second aspect of embodiments herein, the object is achieved by a method in a target base station for supporting update of neighbour cell relations in a cellular communications network. The cellular communications network comprises a user equipment, a source cell and a target cell for the user equipment, a source base station serving the source cell and the target base station serving the target cell. The target base station serves the user equipment in the target cell in response to that the user equipment has switched from being served in the source cell by the source base station. The target base station receives, from the user equipment, in association with the switch, an identifier of the source cell in the cellular communications network and a request for mobility report. The request for mobility report requests the target base station to send a mobility report to the source base station or a management entity thereof. The mobility report reporting that a successful switch has taken place between the source cell and the target cell, thereby supporting update of the neighbour cell relations based on the mobility report.

According to a third aspect of embodiments herein, the object is achieved by a user equipment for supporting update of neighbour cell relations in a cellular communications network. The cellular communications network comprises the user equipment, a source cell and a target cell for the user equipment, a source base station serving the source cell, and a target base station serving the target cell. The user equipment comprises a switching circuitry configured to switch the user equipment from being served in the source cell by the source base station to instead being served in the target cell by the target base station. The user equipment further comprises a sending port configured to send, to the target base station, in association with said switch, an identifier of the source cell in the cellular communications network and a request for mobility report. The request for mobility report requests the target base station to send a mobility report to the source base station or a management entity thereof. The mobility report reporting that a successful switch has taken place between the source cell and the target cell, thereby supporting update of the neighbour cell relations based on the mobility report.

According to a fourth aspect of embodiments herein, the object is achieved by a target base station for supporting update of cell relations in a cellular communications network. The cellular communications network comprises a user equipment, a source cell and a target cell for the user equipment, a source base station serving the source cell and the target base station serving the target cell. The target base station comprises a serving circuitry configured to serve the user equipment in the target cell in response to that the user equipment has switched from being served in the source cell by the source base station. The target base station further comprises a receiving port configured to receive, from the user equipment, in association with the switch, an identifier of the source cell in the cellular communications network and a request for mobility report. The request for mobility report requests the target base station to send a mobility report to the source base station or a management entity thereof. The mobility report reporting that a successful switch has taken place between the source cell and the target cell, thereby supporting update of the neighbour cell relations based on the mobility report.

Hence, embodiments herein support reporting back of successful cell switching of the user equipment to the source base station, or the management entity thereof, even when the target base station is unprepared by the source base station about the switching, i.e. in case of what may be referred to as unprepared mobility. Neighbour cell relations of at least the source base station may then be updated based on the mobility report.

As will be recognized by the skilled person, particular and further advantages of embodiments herein include:

Enabling of improved prioritizing and clean-up among neighbour cell relations in a cellular communication network where only unprepared mobility is used to a specific Radio Access Technology (RAT), e.g. from LTE to GSM, and/or when an operator do not have prepared mobility to a specific cell, frequency or RAT.

Making it possible to verify neighbour cell relations also for unprepared mobility, thereby supporting keeping record of more correct neighbour cell relations.

Enabling of improved prioritization among neighbour cell relations in a cellular communication network where both prepared and unprepared mobility is used

BRIEF DESCRIPTION OF THE DRAWINGS

Examples of embodiments herein are described in more detail with reference to the appended schematic drawings, in which.

DESCRIPTION

Figure 1:
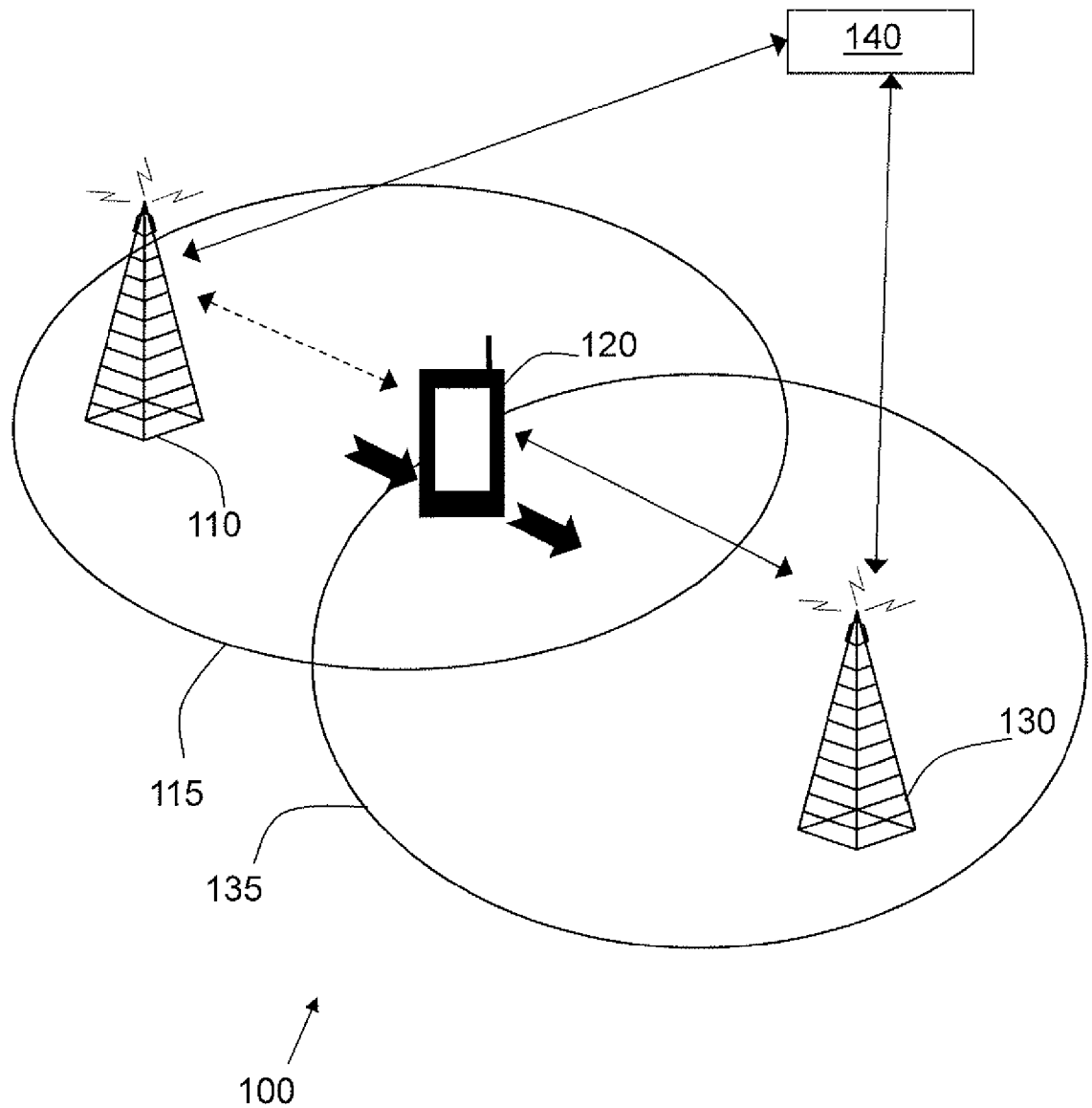
FIG. 1 is a schematic block diagram depicting an example of a cellular communications network.

As part of the development towards embodiments herein, the problem indicated in the Background will first be further discussed, with particular reference to LTE.

In LTE, the purpose of connected mode mobility is that a source eNB shall make the UE in Radio Resource Control (RRC) connected mode to switch from a source cell to a target cell. As already mentioned in the Background, the mobility may be performed with or without preparation in the target base station, which is referred to as prepared and unprepared mobility, respectively.

In prepared mobility, radio resources are prepared in the target eNB before the UE is commanded by the source eNB to change to the target cell. If mobility is performed without preparation in the target eNB, i.e. unprepared mobility, the source base station is still involved in the mobility and there are two main cases, one with and one without sending system information that is specific for the target cell, i.e. target cell specific system information, to the UE.

The following is a list of examples of common mobility functionality in LTE without preparation of the target base station, and which exists in two variants, with and without sending target cell specific system information to the UE:

RRC Connection Release with Redirection without System Information

RRC Connection Release with Redirection with System Information

Cell change order with Network Assisted Cell Change (NACC),

Cell change order without NACC

The cell change order with/without NACC is used when switching from LTE to GSM

The RRC Connection Release with Redirection may be performed when switching from one E-UTRAN cell to another E-UTRAN cell but may also be used to manage the redirection of the UE in RRC connected mode towards a GSM EDGE Radio Access Network (GERAN) and/or UTRAN network when the UE measures poor coverage in the current LTE network. Redirection is controlled by the source eNB and triggered by received UE measurement reports regarding the source cell and optionally also potential target cells. In the case with System Information, i.e. with target cell specific system information, being sent to the UE, this information enables the UE to connect to the target cell faster. In the case without System Information, mobility is performed without sending any target cell specific system information to the UE. However, the source eNB may still send e.g. frequency information to the UE for use when trying to find and connect to a target base station.

The purpose of the Cell change order from E-UTRAN to GERAN (GSM EDGE Radio Access Network) is to transfer, under the control of the Radio Access Technology (RAT) of the source cell, here LTE, a connection for the UE from E-UTRAN to GERAN. The cell change order from the source eNB to the UE may include information facilitating access and/or connection establishment in the target cell, e.g. target cell specific system information.

Further, it may be noted that when target cell specific system information is to be sent to the UE, information from Neighbour cell Relations (NR) is used since the source eNB must obtain information about the neighbour cell being the target cell. When no cell specific system information is to be sent to the UE, the UE may still receive information to be used for finding a target cell, e.g. frequency information, but that is not cell specific. In such case the information may be sent without knowledge of a neighbour cell relation.

In LTE, there is an Automatic Neighbour Relation (ANR) function that resides in the eNB. ANR is triggered when UE measurement reports indicate that a potentially new neighbour cell has been identified. When this occurs, the eNB requests the UE to report the unique Cell Global Identity (CGI) of the potentially new neighbour cell. Using this information, the eNB may automatically create a neighbour cell relation between the serving cell and the potentially new neighbour cell. Any mobility variant that need information about the target cell may then benefit from the neighbour relation. Note that ANR can add relations to E-UTRAN cells as well as Inter Radio Access Technology (IRAT) cells, such as UTRAN and GERAN cells.

ANR may also remove neighbour cell relations, which may be referred to as Neighbour Cell Relation clean-up. One method is to remove cell relations that have not been used within a certain time period. However, the increasing number of cell relations in cellular communication networks of today has resulted in the need for more advanced methods.

One such more advanced method is to remove relations based on a prioritization among the cell relations, i.e. a relative prioritization, and e.g. removal of cell relations with the lowest priority. The following criteria may be used and taken into account when a relation is to be removed:

Latest used. The shorter time since the relation was used, the higher priority for the relation.

Number of handovers. The higher number of handovers for a cell relation, the higher priority. In other words, a relation that is used in many handovers is not likely to be removed.

Statistics for successful handover. The better handover success rate, the higher priority.

The relation with the lowest priority may be removed e.g. when the number of cell relations of a source cell reaches a specified limit.

The above exemplified criteria and method for neighbour cell relation clean-up, and similar methods, assume that the source eNB gets information about successful handover and that this information is received from the target eNB. As mentioned in the Background, this works well when the relation is used for prepared mobility, but not in case of unprepared mobility, such as in the four examples above relating to RRC Connection Release with Redirection and Cell change order. In case of unprepared mobility the source eNB may know if the relation was used but it does not know if it was successfully used. Thus, for example the criterion of "latest used" may result in that a cell relation that was used for unprepared mobility a lot of times, but fails every time, gets a high priority. This may be a particular problem for operators that use only unprepared mobility.

Moreover, some operators may use both prepared mobility and unprepared mobility. Some neighbour cell relations may be used for prepared mobility whereas other relations may be used mainly for unprepared mobility. The neighbour cell relations that are only or mainly used for unprepared mobility may thus get an undesirably low priority.

FIG. 1 is a schematic block diagram depicting an example of a cellular communications network 100 relevant for embodiments herein, which may be an LTE cellular communication network. The cellular communications network 100 may comprise a radio access network and a core network (not explicitly indicated in FIG. 1). In an LTE-based or LTE-related system, the radio access network may correspond to what commonly is referred to as the Evolved UMTS Terrestial Radio Access Network (E-UTRAN) and the core network may correspond to what commonly is referred to as the Evolved Packet Core (EPC). The shown radio communications system 100 comprises a source base station 110 serving a source cell 115 and a target base station 130 serving a target cell 135. The target cell 135 is a neighbour cell to the source cell 115. The base station 110 and the neighbouring base station 130 may be a respective eNB, or eNodeB, when the cellular communications network 100 is LTE based, but may in other embodiments be of another type and/or be referred to by different names, such as RBS, NodeB, BTS, depending on technology and terminology used.

The cellular communications network 100 shown in FIG. 1 further comprises a user equipment 120. The user equipment 120 is shown located within both cells 115, 135, and may thus in the shown situation be served by either one of the source base station 110 and the target base station 130. When the radio communications system 100 comprises a radio access network and a core network, the user equipment 120 is typically comprised in and arranged to receive and send information over the radio access network. The user equipment is shown in connection with a thick filled black arrows illustrating that embodiments herein relate to a situation when the user equipment 120 is moving from the source cell 115 to the target cell 135 and switching from being served in the source cell 115 by the source base station 110 to instead being served in the target cell 135 by the target base station 130. The dashed double arrow between the user equipment 120 and source base station 110 and the solid double arrow between the user equipment 120 and the target base station 130 are for illustrating this situation as well.

As should be appreciated, the naming "source" and "target" is for facilitating understanding in the context of embodiments herein and the naming is in relation to the above-mentioned situation with the user equipment 120 switching from the source cell 115 to the target cell 135. In practice the target cell 135 and the target base station 130 may at the same time correspond to a source cell and source base station respectively, or vice versa, for another user equipment, or even the same user equipment 120 but in another situation.

It is emphasized that the situation schematically shown in FIG. 1 is merely an example and not a situation that in every detail is a prerequisite for all embodiments herein, as will be understood from the below. For example, in some embodiments the source base station 110 and the target base station 130 may be the same base station serving two separate cells corresponding to the source cell 115 and the target cell 135. In some embodiments the user equipment 120 may support two different communication technologies, e.g. LTE and GSM and the source cell 115 and the target cell 135 may support one of the technologies each, the switching thus involving switching between LTE and GSM.

The cellular communications network 100 may further comprise a management entity 140, as shown in FIG. 1. The management entity 140 is associated with the radio communications system 100 and has knowledge of and is able to contact base stations comprised therein, including the source base station 110 and the target base station 130. In some embodiments the management entity 140 may be integrated or located with a base station. The management entity 140 may as shown be shared between multiple base stations, however, in some embodiments (not shown) there may be one management entity per base station. In case of an LTE-based or related system, the management entity may be a device, for example a server, that implements functionality pertaining to what is referred to as Domain Management (DM) and/or Network Management System (NMS).

It is reminded that FIG. 1 is only schematic and that the cellular communications network 100 in reality may comprise several further base stations, user equipment, and other network nodes, including management entities, which are not shown here.

Figure 2:
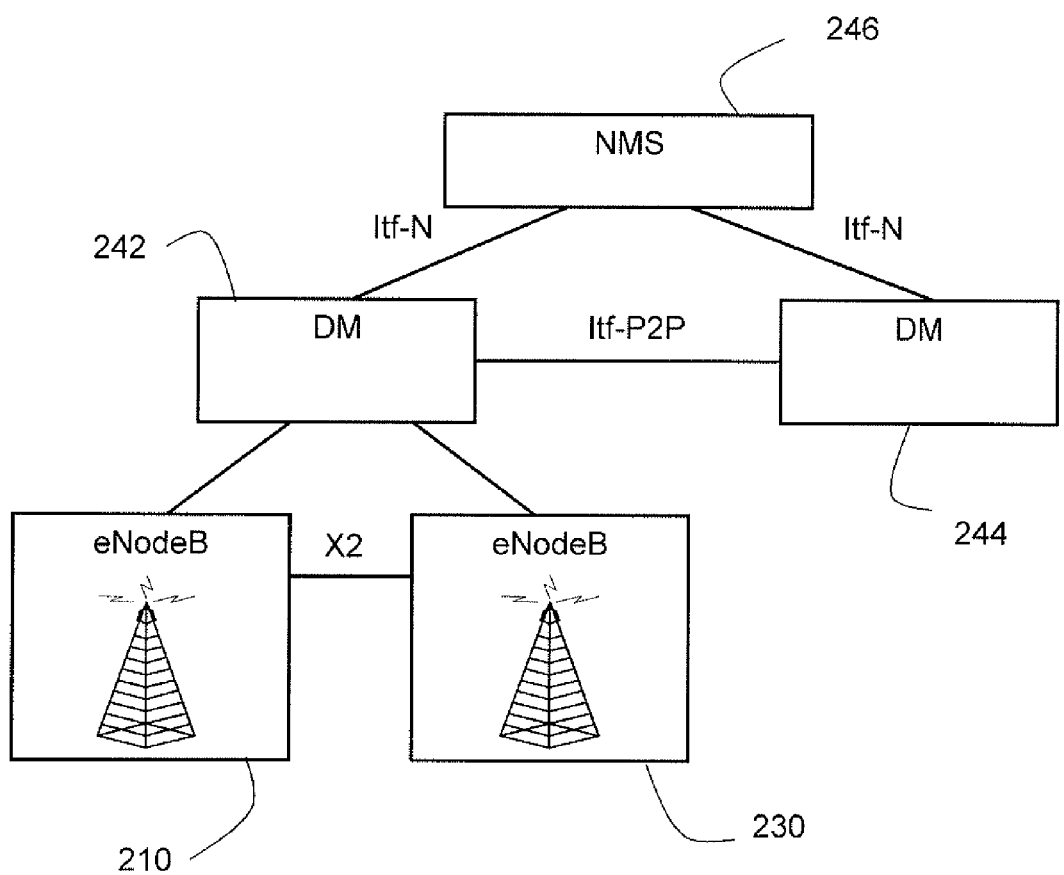
FIG. 2 is a schematic block diagram illustrating an LTE based example of a management system that may be used with embodiments herein.

FIG. 2 is a schematic block diagram showing an LTE based example of a management system that may be used with embodiments herein and may be part of the cellular communications network 100 discussed in the foregoing. Two base stations 210, 230, are shown with a logical interface X2, used in LTE, for communication between the base stations 210, 230. The base stations may e.g. correspond to the base stations 110, 130 shown in FIG. 2. The base stations 210, 230 are managed by a Domain Manager (DM) 242, which may also be referred to and/or be part of an Operation and Support System (OSS). Also a second Domain Manager 244 is shown. The two DMs 242, 244 are in turn managed by a Network Management System (NMS) 246. An interface peer-to-peer Itf-P2P) for communication between the DMs 242, 244 is also shown in the figure, as well as an interface North (Itf-N) for communication between the NMS 246 and respective DM 242, 244. One or more of the DMs and the NMS may correspond to the management entity 140 shown in FIG. 1.

In LTE the above mentioned ANR function detects and adds neighbour relations to the cells. The ANR function resides in the eNB, such as base stations 210, 230 in FIG. 2, and manages a conceptual Neighbour Relation Table (NRT). That is, ANR adds and deletes cell relations in the NRT. When ANR has added or deleted a neighbour cell relation, the management system is notified. The management system keeps a logical network model of the network including neighbour cell relations. As known to the person skilled in LTE, the management system may also perform other functions, such as configuration management (CM), fault management (FM) and performance management (PM).

Figure 3:
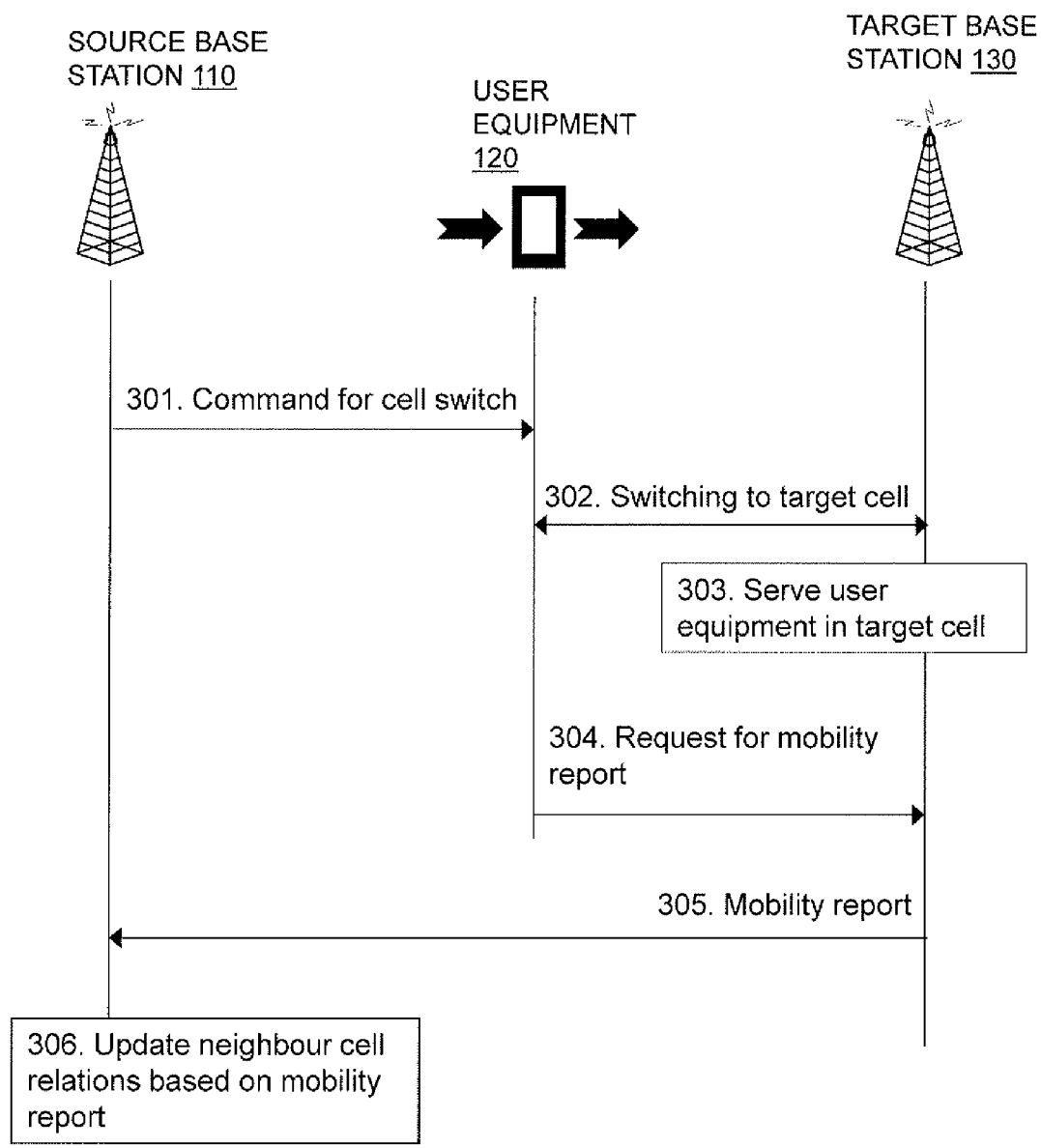
FIG. 3 is a combined signalling diagram and flowchart illustrating embodiments herein.

Embodiments herein for supporting update of neighbour cell relations in the cellular communications network 100, will now be described with reference to the combined signaling diagram and flowchart depicted in FIG. 3.

Action 301

In this action, which is optional for embodiments herein, the source base station 110 sends and the user equipment 120 receives a command for cell switch. The command is commanding the user equipment 120 to switch from being served in the source cell 115 by the source base station 110 to instead being served in the target cell 135 by the target base station 130.

With reference to the LTE examples in the foregoing, the RRC Connection Release with Redirection and Cell change order are examples that may correspond to the command for cell switch. These are commands that are used in case of unprepared mobility as previously explained. The command for cell switch may thus be associated with a situation where the target base station 130 is unprepared by the source base station 110 about the switching. Further, the command for cell switch may command the user equipment 120 to release the source cell 115.

The command for cell switch may comprises one or more parameters to be used by the user equipment 120 for connecting to the target base station 130 during the switching. The one or more parameters may comprise information that is specific for the target cell and/or comprise other information for use by the user equipment (120) for trying to find and/or connect to the target base station (130). That is, the one or more parameters may correspond to the target cell specific system information discussed above and/or comprise other information, e.g. frequency information, for use by the user equipment 120 for trying to find and/or connect to the target base station 130. The information that is specific for the target cell may have been retrieved by the source base station 110 by using its neighbour cell relations (NR), e.g. Neighbor Relation Table (NRT).

In some embodiments with no action 301, the user equipment 120 may instead e.g. initiate a cell switch on its own initiative.

Action 302

The user equipment 120 switches from being served in the source cell 115 by the source base station 110 to instead being served in the target cell 135 by the target base station 130. As the skilled person realizes this is typically a process involving communication between the user equipment 120 and the target base station 130 and that typically starts with the user equipment 120 contacting the target base station 130 and typically ends with access in the target cell 135, release of the source cell 115 and with the user equipment 120 starting to be served by the target base station 130 in the target cell 135.

In case the user equipment 120 received a command for cell switch as discussed for action 301 above, the switching is made in response to the received command. One or more parameters received with the command may be used by the user equipment 120 for connecting to the target base station 130 during the switching. For example, in case of LTE this action may correspond to actions that are taken part between the user equipment 120 and the target base station 130 in response to that the user equipment 120 has received the above discussed RRC Connection Release with Redirection or Cell change order from the source base station 110.

Action 303

The user equipment 120 is served in the target cell 135 by the target base station 130 This action is performed in response to the switching of the user equipment 120 from being served in the source cell 115 by the source base station 110 to being served in the target cell 135 by the target base station 130, as described in the previous action. Action 304

An identifier of the source cell 115 in the cellular communications network 100 and a request for mobility report are sent by the user equipment 120 to, and received by, the target base station 130. In some cellular communication networks, such as in LTE, the identifier of the source cell is enough to also identify the source base station 110. In other communication systems, such as in GSM and UTRAN, other identities, such as Location Area Identities and Routing Area Identities, may be needed to identify and set up a communication to the source base station 110, or in general to a controlling node, of the source cell 115. All the necessary identities or addresses to also be able to also identify the source base station 110 are herein commonly referred to as the identifier of the source cell.

The request for mobility report requests the target base station 130 to send a mobility report to the source base station 110 or the management entity 140 thereof. The mobility report is for reporting that a successful switch has taken place between the source cell 115 and the target cell 135, thereby supporting update of the neighbour cell relations based on the mobility report, which will be further discussed below. The identifier of the source cell enables the target base station 130 to contact and send the mobility report to the source base station 110 or the management entity 140.

The identifier and the request are sent in association with the switching. In some embodiments the request is sent during the switching, e.g. as part of action 302. In other embodiments it may be sent once the switching has completed and the user equipment 120 is being served in the target cell 135, i.e. it may be sent during action 303.

Hence, from the above it is understood that reporting back of successful cell switching of the user equipment to the source base station, or the management entity thereof is enabled, even when the target base station is unprepared by the source base station about the switching, i.e. in case of what may be referred to as unprepared mobility. Neighbour cell relations of at least the source base station may then be updated based on the mobility report.

The identifier of the source cell 115 may be a unique Cell Global Identity (CGI) of the source cell 115. The identifier of the source cell 115 may be available to the user equipment 120 as a result from it being served by the source base station 110. The identifier of the source cell 115 may have been received by the user equipment 120 with or without the user equipment 120 requesting it. In some embodiments the identifier of the source cell 115 may be comprised in the command for cell switch discussed above under action 301.

Further, in some embodiments the request for mobility report may comprise at least one parameter that was used by the user equipment 120 for connecting to the target base station 130 during the switching. This will make it possible for the target base station to indicate in the mobility report at least one parameter that was used in the successful switch. One or more of the at least one parameter may in turn correspond to one or more parameters previously received from the source base station 110 for connecting to the target base station 130 during the switching. The previously received parameters may be those comprised in the command for cell switch, as discussed above under action 301. This makes it possible for the source base station 110, or management entity 140 thereof, to, based on the mobility report, verify which of the parameters sent to the user equipment for the switching that were actually used and/or useful.

In some embodiments the request for mobility report comprises an identifier of the user equipment (120), which identifier of the user equipment (120) was used in the source cell (115). The mobility report then comprises said identifier of the user equipment (120). The identifier of the user equipment may be a Cell Radio Network Temporary Identifier (C-RNTI) or ShortMAC-I in E-UTRAN. Hence, when received, the target base station 130 may add the identifier of the user equipment in the mobility report and thereby the source base station 110 may associate a received mobility report with retained information about the user equipment 120 from when it was previously being served by the source base station 110. The neighbour cell relations may then be updated based on the retained information associated with the mobility report.

The request for mobility report may be an explicit or implicit request. For example, in some embodiments the request may comprise a request specific message that has a predetermined meaning to the target base station 135 and that upon receipt triggers the target base station 135 to respond accordingly. In some embodiments the request may be part of, or correspond to, another, e.g. already existing, message that is sent in association with the switching from the source cell to the target cell. When receiving the existing message the target base station 130 may have been configured to trigger upon it as the received request and to respond accordingly. In some embodiments the received identifier of the source base station 110 may function as the request.

Note that the identifier of the source cell 115 in the cellular communications network 100 and the request for mobility report may be sent in separate messages. The separate messages may be associated to each other.

Also note that the request for mobility report need not be a single message sent from the user equipment 120 to the target base station 130. The request for mobility report may comprise an initial message sent to the target base station 130, which message the target base station 130 replies to, e.g. only since it supports handling of mobility reports. The user equipment 120 may then, in response to the reply, send further information of the request for mobility report. For example, in case the request for mobility report comprises information, such as the above mentioned at least one parameter and/or identifier of the user equipment 120, this information may be sent by the user equipment 120 in response to a reply from the target base station 130 following an initial message of the request sent to the target base 130 station by the user equipment 120.

The request for mobility report, or the above mentioned initial message of the request for mobility report, may correspond to a parameter in a message that may have also other purpose and/or use.

For example, in case of LTE, the request for mobility report may comprise a parameter in an RRCConnectionSetupComplete or RRCReestablishmentComplete message from the user equipment 120, indicating the availability of information in the user equipment 120 for a mobility report. The target base station 130 may then respond to this by requesting further information comprised in the request from the user equipment 120, e.g. by using UEInformationRequest and UEInformationResponse messages.

Action 305

In this action, which is optional for embodiments herein, the target base station 130 sends, in response to the received request for mobility report, the mobility report to the source base station 110 by using the received identifier of the source base station 110. In some embodiments the mobility report is instead sent to the management entity 140 of the source base station 110. This mat e.g. be the case when neighbour cell relations for the source base station 110 are handled by the management entity 140 and not by the source base station 110 as such.

In some embodiments, the mobility report comprises an identifier of the target cell 135 in the cellular communications network 100. The identifier of the target cell may be a unique Cell Global Identity (CGI) of the target cell 135. By means of the identifier the source base station 110 may, after receipt of the mobility report, add or verify the target cell 135 as a cell relation that is working and to which a successfully switch is possible. Hence, the mobility report supports updating of neighbour cell relations for the source base station 110.

In some embodiments the mobility report may comprise the user equipment identifier, as described above under action 304.

In some embodiments, where no target cell identifier is comprised in the mobility report, the source base station 110 may remember a sent cell switch command to the user equipment 120 and assume that the received mobility report relates to the sent command. In case the mobility report comprises the identifier of the user equipment 120, as described above and in action 304, the identifier may be used to relate the mobility report to the sent command. Hence, updating of neighbour cell relations may be supported even without a target cell identifier.

Further, in some embodiments the mobility report may identify at least one parameter that was used by the user equipment 120 for connecting to the target base station 130 during the switching. This makes it possible not only to update the neighbor cell relations as such, but also related information, such as information that may be used to connect to a neighbour cell. As already mentioned above under action 304, the at least one parameter may in turn correspond to one or more parameters previously received from the source base station 110 for connecting to the target base station 130 during the switching. For example, the at least one parameter may be comprised in the command for cell switch, which makes it possible to verify which parameters sent were actually used and useful.

For example, in case of LTE, the mobility report may be sent in a Handover Report message over the X2 interface or in a similar message, e.g. Mobility Report, defined for this purpose.

The mobility report may be sent directly to the source base station 110 or via an intermediate network node (not shown), e.g. another base station or the management entity 140. In case the mobility report is sent to the management entity 140, it may also be sent directly or via an intermediate node, e.g. another base station or another management entity.

The intermediate nodes may e.g. correspond to Mobility Management Entity (MMEs) or Serving GPRS Support Nodes (SGSNs), defined by 3GPP, and recognized by the skilled person. In such case the Radio Access network (RAN) Information Message, abbreviated RIM, procedure, known from the same context, may be used.

In some embodiments the source base station 110 and the target base station 130 are the same and the present action is thus superfluous and the handling of the mobility report may be carried out internally.

Action 306

In this action, which is optional for embodiments herein, the source base station 110 updates its neighbour cell relations based on the received mobility report. For example, this may involve updating the Neighbor Relation Table (NRT).

In some embodiments there may be update of the neighbour cell relations based on non-receipt of an expected mobility report. This may be the case when a neighbour cell relation was used to send a command for cell switch and a mobility report was expected in case of a successful switch. Absence of the mobility report may then be treated as an indication of a non-working neighbor cell relation and the NR be updated accordingly. To not interpret a missing mobility report as a failed cell switch by the user equipment 120 when the actual reason is incapability of the target base station 130 to send a mobility report, the source base station 110 and target base station 130 may exchange information about the capability to send and receive mobility reports. In E-UTRAN this capability of information exchange may e.g. be included in the X2 Setup and eNB Configuration Update procedures.

How information in the mobility report may be used for updating the neighbor cell relations has to some extent already been discussed for the previous actions and that information will not be repeated here.

The present action may involve updating statistics for a used neighbour cell relation. Further the present action may involve prioritization among neighbour cell relations based on the statistics.

When the source base station 110 or the management entity 140 thereof receives the mobility report, it may update mobility statistics for the source cell 115 and may also do so for the target cell 135. The statistics may be with regard to successful and/or unsuccessful mobility to the target cell 135. The statistics may then be used to evaluate and prioritize neighbour cell relations. In case the mobility report identifies a new neighbour cell relation, e.g. a not previously known target cell 135, the information in the mobility report may be used to add a new neighbour cell relation, e.g. adding it to the NRT.

If an operator only has unprepared mobility to a specific RAT, the received mobility report may be used to verify that the involved neighbour cell relation is one that may be successfully used for mobility actions. A neighbour cell relation for unprepared mobility may get increased priority if it is a short time period since it last was successfully used, and/or has a high success rate.

When a limit for how many neighbour cell relations may be stored is reached, the neighbour cell relation with the lowest priority may be removed.

An operator may use both prepared and unprepared mobility to a specific RAT. To ensure that the best target cells for both types of mobility are available as neighbour cell relations, e.g. in the neighbour relation table (NRT), specified numbers for both types of relations may be reserved in the NRT. These numbers may be set fixed or as a relative part of the total NRT by a management system, e.g. the management system discussed above in connection with FIG. 2. Prioritization of neighbour relations for unprepared mobility may then be based on received mobility reports and/or statistics based on these reports. If prepared mobility and unprepared mobility are not separated, e.g. as mentioned by not reserving specific numbers depending on the type, prioritization may be based on received mobility reports in case of unprepared mobility together with conventional reporting in case of prepared mobility. Hence, a mobility report received in case of unprepared mobility may affect prioritization for a neighbour cell relation that is also used for prepared mobility, and vice versa.

In some embodiments, for which updating of neighbour cell relations of the source base station 110 is handled by the management entity 140, the updating of neighbour ell relations described for the present action may instead take place in the management entity.

Figure 4:
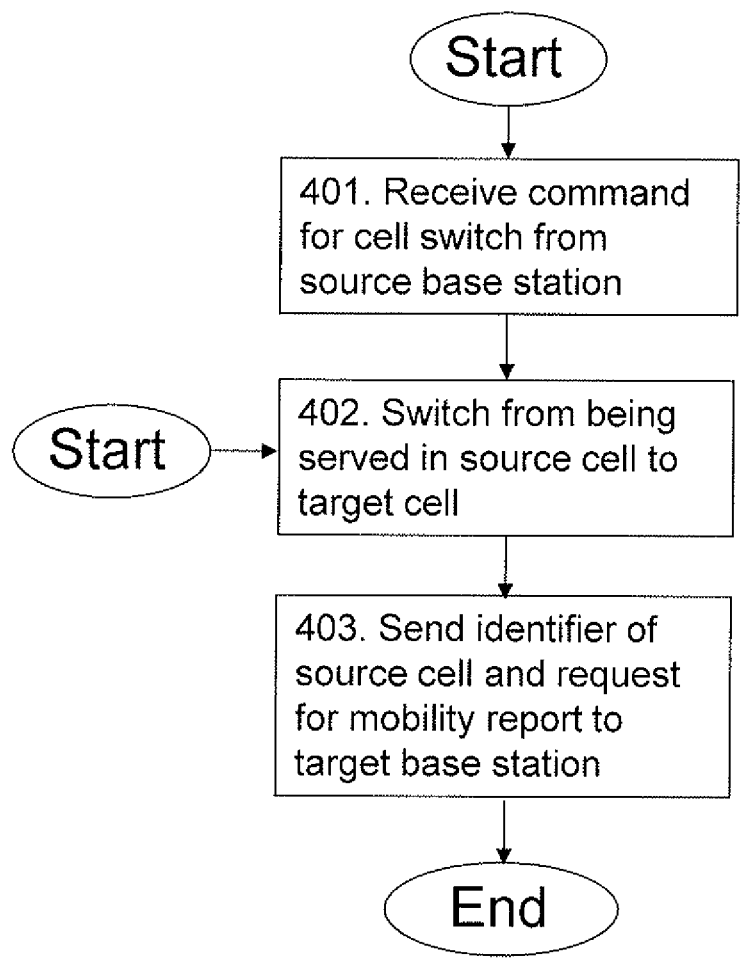
FIG. 4 is a flow chart illustrating a method in a user equipment according to embodiments herein.

Embodiments herein relating to a method in the user equipment 120 for supporting update of neighbour cell relations in the cellular communications network 100, will now be further elaborated and described with reference to the flowchart depicted in FIG. 4. As previously mentioned, the cellular communications network 100 comprises the user equipment 120, the source cell 115 and the target cell 135 for the user equipment 120, the source base station 110 serving the source cell 115, and the target base station 130 serving the target cell 135. The method comprises the following actions, which actions may be taken in any suitable order. Further, actions may be combined.

Action 401

This is an optional action for embodiments herein. The user equipment 120 receives from the source base station 110, a command for cell switch, which command is commanding the user equipment 120 to switch cell according to Action 402, described below.

In some embodiments, the command for cell switch comprises one or more parameters to be used by the user equipment 120 for connecting to the target base station 130 during the switching.

The command for cell switch may be associated with a situation where the target base station 130 is unprepared by the source base station 110 about the switching This action may correspond fully or partially to the previously described action 301

Action 402

The user equipment 120 switches from being served in the source cell 115 by the source base station 110 to instead being served in the target cell 135 by the target base station 130. In some embodiments the switch is made in response to the command for cell switch received according to Action 401 described above.

This action may correspond fully or partially to the previously described action 302

Action 403

In association with the switch according to Action 402 described above, the user equipment 120 sends to the target base station 130, an identifier of the source cell 115 in the cellular communications network 100 and a request for mobility report. The request for mobility report is requesting the target base station 130 to send a mobility report to the source base station 110 or a management entity 140 thereof. The mobility report for reporting that a successful switch has taken place between the source cell 115 and the target cell 135, thereby supporting update of the neighbour cell relations based on the mobility report.

In some embodiments the mobility report comprises an identifier of the target cell 135 in the cellular communications network 100.

In some embodiments, the request for mobility report comprises at least one parameter that was used by the user equipment 120 for connecting to the target base station 130 during the switch of cell according to Action 402 described above. One or more of the at least one parameter may correspond to one or more parameters previously received from the source base station 110 for connecting to the target base station 130 during the switch of cell according to Action 402. The one or more previously received parameters may comprise information that is specific for the target cell 135 and/or comprise other information for use by the user equipment 120 for trying to find and/or connect to the target base station 130. Further, the mobility report may identify said at least one parameter that was used by the user equipment 120 for connecting to the target base station 130 during the switch of cell according to Action 402.

In some embodiments, the request for mobility report comprises an identifier of the user equipment 120, which identifier of the user equipment 120 was used in the source cell 115. The mobility report may comprises said identifier of the user equipment 120.

This action may correspond fully or partially to the previously described action 304

Figure 5:
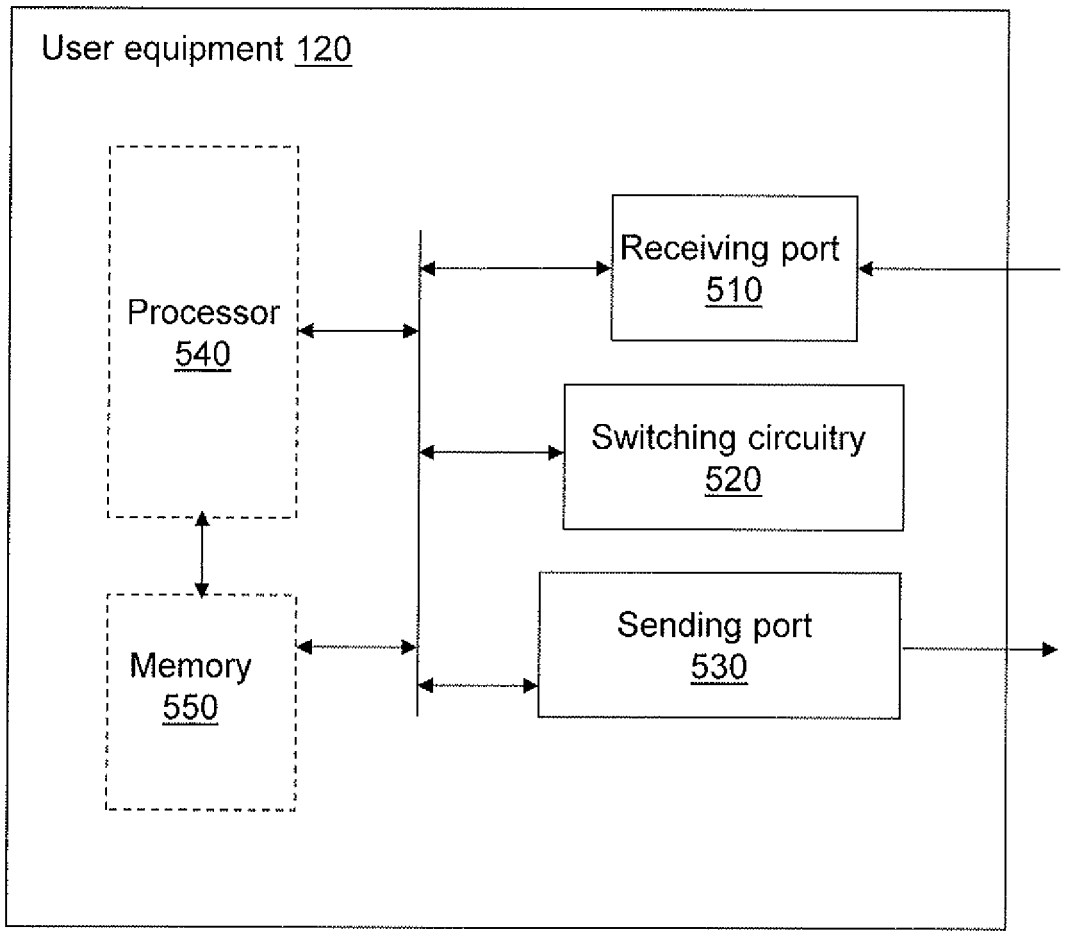
FIG. 5 is a schematic block diagram illustrating a user equipment according to embodiments herein.

To perform the actions above for supporting update of neighbour cell relations in the cellular communications network 100, the user equipment 120 may comprise an arrangement schematically depicted in FIG. 5.

The user equipment 120 may typically comprise a receiving port 510 that may be configured to receive the command for cell switch from the source base station 110

The user equipment 120 comprises a switching circuitry 520, configured to switch the user equipment 120 from being served in the source cell 115 by the source base station 110 to instead being served in the target cell 135 by the target base station 130.

The user equipment 120 further comprises a sending port 530, configured to send, to the target base station 130, in association with said switch, the identifier of the source cell 115 in the cellular communications network 100 and the request for mobility report.

The embodiments of the user equipment 120 may be implemented through one or more processors, such as a processor 540 in the user equipment 120 depicted in FIG. 5, together with computer program code for performing the functions and actions of embodiments herein. In some embodiments the ports and circuitry discussed above may be fully or partially implemented by the processor 540.

The computer program code mentioned above may also be provided as a computer program product, for instance in the form of a data carrier carrying computer program code for performing the embodiments herein when being loaded into the in the user equipment 120. One such carrier may be in the form of a CD or DVD. It is however feasible with other data carriers such as a memory stick, memory card or hard drive. The computer program code may furthermore be provided as pure program code on a server for download to the user equipment 120. The computer program code may furthermore be provided in the form of a data file or files on, or available through, a server for download. The file or files may be executable files for direct or indirect download to and execution on the user equipment 120, or may be for intermediate download and compilation to make them executable before download to and for execution on the user equipment 120. The server may be accessible over a computer network, such as the Internet, and may e.g. be a web or ftp server.

The user equipment may further comprise a memory 550 comprising one or more memory units. The memory 550 is arranged to store data, such as final and/or intermediate results, the identifiers of the source cell 115 and/or target cell 135, and program code, configurations and/or applications to perform the method when being executed in the user equipment 120.

Those skilled in the art will also appreciate that the receiving port 510, the switching circuitry 520 and the sending port 530, may refer to a combination of analog and digital circuits, and/or one or more processors configured with software and/or firmware (e.g., stored in memory) that, when executed by the one or more processors such as the processor 540, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
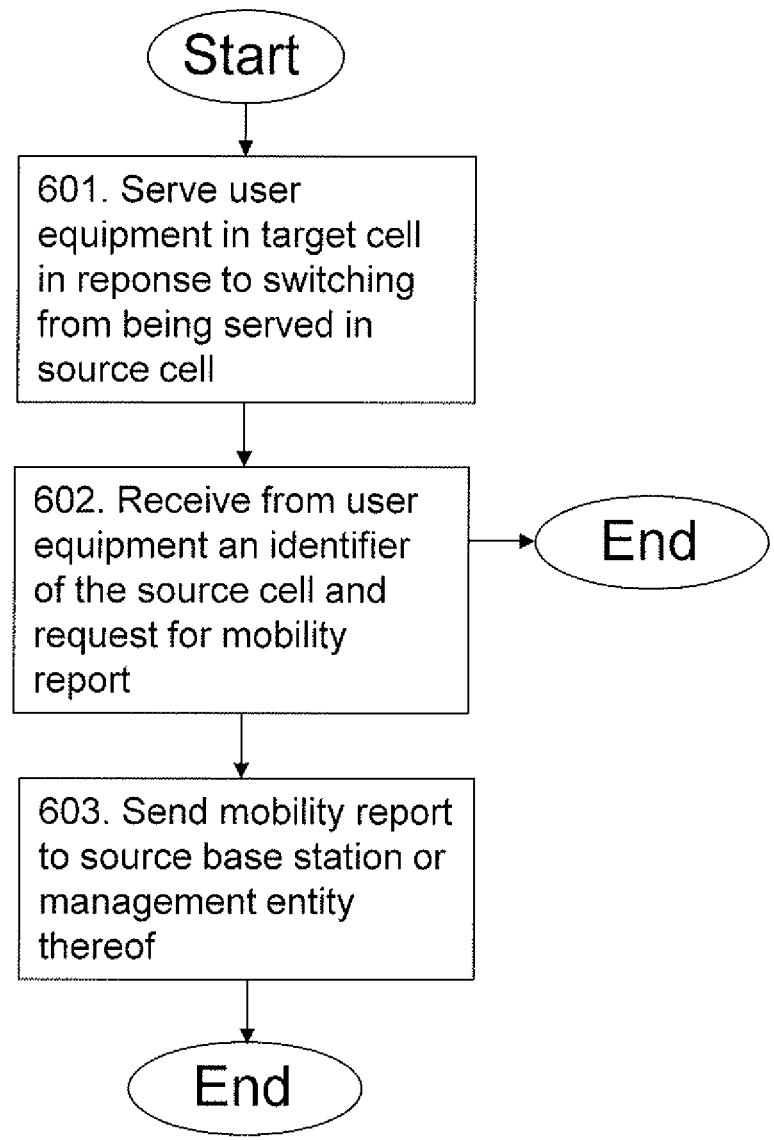
FIG. 6 is a flow chart illustrating a method in a target base station according to embodiments herein.

Embodiments herein relating to a method in the target base station 130 for supporting update of neighbour cell relations in the cellular communications network 100, will now be further elaborated and described with reference to the flowchart depicted in FIG. 6. As previously mentioned, the cellular communications network 100 comprises the user equipment 120, the source cell 115 and the target cell 135 for the user equipment 120, the source base station 110 serving the source cell 115, and the target base station 130 serving the target cell 135. The method comprises the following actions, which actions may be taken in any suitable order. Further, actions may be combined.

Action 601

The target base station 130 serves the user equipment 120 in the target cell 135 in response to that the user equipment 120 has switched from being served in the source cell 115 by the source base station 110.

In some embodiments, the switch was made in response to a command for cell switch received by the user equipment 120 from the source base station 110, which command commanded the user equipment 120 to perform the switch. The command for cell switch may comprise one or more parameters to be used by the user equipment 120 for connecting to the target base station 130 during the switching. The command for cell switch may be associated with a situation where the target base station 130 is unprepared by the source base station 110 about the switching.

This action may correspond fully or partially to the previously described action 303.

Action 602

The target base station 130 receives from the user equipment 120, in association with the switch, an identifier of the source cell 115 in the cellular communications network 100 and a request for mobility report. The request for mobility report is requesting the target base station 130 to send a mobility report to the source base station 110 or a management entity 140 thereof. The mobility report reporting that a successful switch has taken place between the source cell 115 and the target cell 135, thereby supporting updating of the neighbour cell relations based on the mobility report.

In some embodiments, the mobility report comprises an identifier of the target cell 135 in the cellular communications network 100.

In some embodiments, the request for mobility report comprises at least one parameter that was used by the user equipment 120 for connecting to the target base station 130 during the switch. One or more of the at least one parameter may correspond to one or more parameters previously received by the user equipment 120, from the source base station 110, for connecting to the target base station 130 during the switch. The one or more previously received parameters may comprise information that is specific for the target cell and/or comprise a other information for use by the user equipment 120 for trying to find and/or connect to the target base station 130. The mobility report may identify said at least one parameter that was used by the user equipment 120 for connecting to the target base station 130 during the switching.

In some embodiments, the request for mobility report comprises an identifier of the user equipment 120, which identifier of the user equipment 120 was used in the source cell 115. The mobility report may comprise said identifier of the user equipment 120.

This action may correspond fully or partially to the previously described action 304

Action 603

This is an optional action for embodiments herein. The target base station 130 sends, in response to the received request for mobility report and by using the received identifier of the source base station 110, the mobility report to the source base station 110 or the management entity 140 thereof.

This action may correspond fully or partially to the previously described action 305

Figure 7:
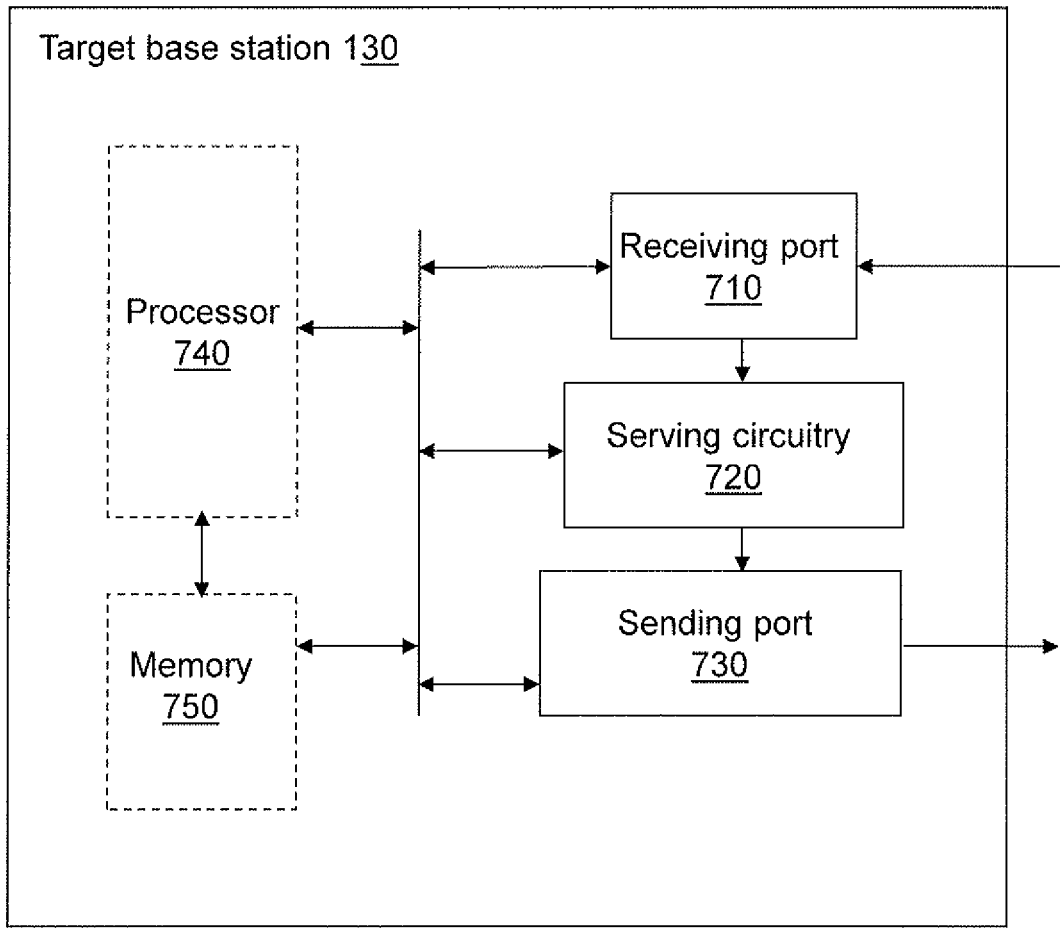
FIG. 7 is a schematic block diagram illustrating a target base station according to embodiments herein.

To perform the actions above for supporting update of neighbour cell relations in the cellular communications network 100, the target base station 130 may comprise an arrangement schematically depicted in FIG. 7.

The target base station 130 comprises a receiving port 710, configured to receive, from the user equipment 120, in association with the switch, the identifier of the source cell 115 in the cellular communications network 100 and the request for mobility report.

The target base station 130 further comprises a serving circuitry 720, configured to serve the user equipment 120 in the target cell 135 in response to that the user equipment 120 has switched from being served in the source cell 115 by the source base station 110.

The target base station 130 may also typically comprise a sending port 730 that may be configured to send, in response to the request for mobility report and by using the identifier of the source cell 115, the mobility report to the source base station 110 or the management entity 140 thereof.

The embodiments of the target base station 130 may be implemented through one or more processors, such as a processor 740 in the target base station 130 depicted in FIG. 7, together with computer program code for performing the functions and actions of embodiments herein. In some embodiments the ports and circuitry discussed above may be fully or partially implemented by the processor 740.

The computer program code mentioned above may also be provided as a computer program product, for instance in the form of a data carrier carrying computer program code for performing the embodiments herein when being loaded into the in the target base station 130. One such carrier may be in the form of a CD or DVD. It is however feasible with other data carriers such as a memory stick, memory card or hard drive. The computer program code may furthermore be provided as pure program code on a server for download to the target base station 130. The computer program code may furthermore be provided in the form of a data file or files on, or available through, a server for download. The file or files may be executable files for direct or indirect download to and execution on the target base station 130, or may be for intermediate download and compilation to make them executable before download to and for execution in the target base station 130. The server may be accessible over a computer network, such as the Internet, and may e.g. be a web or ftp server.

The target base station 130 may further comprise a memory 750 comprising one or more memory units. The memory 750 is arranged to store data, such as final and/or intermediate results, the identifiers of the source cell 115 and/or target cell 135, the mobility report for sending, and program code, configurations and/or applications to perform the method when being executed in the target base station 130.

Those skilled in the art will also appreciate that the receiving port 710, the serving circuitry 720 and the sending port 730, may refer to a combination of analog and digital circuits, and/or one or more processors configured with software and/or firmware (e.g., stored in memory) that, when executed by the one or more processors such as the processor 540, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Many embodiments and examples that have been described and discussed herein relate to LTE and embodiments herein are particularly well suited to be used with LTE based systems. However, this is not to be construed as limiting embodiments herein to LTE only.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a user equipment for supporting update of neighbor cell relations in a cellular communications network, the cellular communications network comprising the user equipment, a source cell and a target cell for the user equipment, a source base station serving the source cell, and a target base station serving the target cell, wherein the method comprises:
    switching from being served in the source cell by the source base station to instead being served in the target cell by the target base station, and
    sending, to the target base station, in association with the switching, an identifier of the source cell in the cellular communications network and a request for mobility report requesting the target base station to send a mobility report to the source base station or a management entity thereof, the mobility report reporting that a successful switch has taken place between the source cell and the target cell, thereby enabling updating of the neighbor cell relations based on the mobility report, wherein the request for mobility report comprises at least one parameter that was used by the user equipment for connecting to the target base station during the switching.

2. The method as claimed in claim 1, wherein the mobility report comprises an identifier of the target cell in the cellular communications network.

3. The method as claimed in claim 1, wherein one or more of the at least one parameter correspond to one or more parameters previously received from the source base station for connecting to the target base station during the switching.

4. The method as claimed in claim 3, wherein the one or more previously received parameters comprises information that is specific for the target cell and/or comprise a target frequency.

5. The method as claimed in claim 1, wherein the mobility report identifies said at least one parameter that was used by the user equipment for connecting to the target base station during the switching.

6. The method as claimed in claim 1, wherein the method further comprises:
    receiving, from the source base station, a command for cell switch, which command is commanding the user equipment to perform the switching, and
wherein the switching is made in response to the received command.

7. The method as claimed in claim 6, wherein the command for cell switch comprises one or more parameters to be used by the user equipment for connecting to the target base station during the switching.

8. The method as claimed in claim 6, wherein the command for cell switch is associated with a situation where the target base station is unprepared by the source base station about the switching.

9. A method in a target base station for supporting update of neighbor cell relations in a cellular communications network, the cellular communications network comprising a user equipment, a source cell and a target cell for the user equipment, a source base station serving the source cell and the target base station serving the target cell, wherein the method comprises:
    serving the user equipment in the target cell in response to that the user equipment has switched from being served in the source cell by the source base station, and
    receiving, from the user equipment, in association with the switch, an identifier of the source cell in the cellular communications network and a request for mobility report requesting the target base station to send a mobility report to the source base station or a management entity thereof, the mobility report reporting that a successful switch has taken place between the source cell and the target cell, thereby supporting updating of the neighbor cell relations based on the mobility report, wherein the request for mobility report comprises at least one parameter that was used by the user equipment for connecting to the target base station during the switch.

10. The method as claimed in claim 9, wherein the method further comprises:
sending, in response to the received request for mobility report and by using the received identifier of the source base station, the mobility report to the source base station or the management entity thereof.

11. A user equipment for supporting update of neighbor cell relations in a cellular communications network, the cellular communications network comprising the user equipment, a source cell and a target cell for the user equipment, a source base station serving the source cell, and a target base station serving the target cell, wherein the user equipment comprises:
a switching circuitry, configured to switch the user equipment from being served in the source cell by the source base station to instead being served in the target cell by the target base station, and
a sending port, configured to send, to the target base station, in association with said switch, an identifier of the source cell in the cellular communications network and a request for mobility report requesting the target base station to send a mobility report to the source base station or a management entity thereof, the mobility report reporting that a successful switch has taken place between the source cell and the target cell, thereby supporting updating of the neighbor cell relations based on the mobility report, wherein the request for mobility report comprises at least one parameter that was used by the user equipment for connecting to the target base station during the switch.

12. The user equipment as claimed in claim 11, further comprising:
a receiving port, configured to receive, from the source base station, a command for cell switch commanding the user equipment to perform switching from being served in the source cell by the source base station to instead being served in the target cell by the target base station.

13. A target base station for supporting update of neighbor cell relations in a cellular communications network, the cellular communications network comprising a user equipment, a source cell and a target cell for the user equipment, a source base station, serving the source cell and the target base station serving the target cell, wherein the target base station comprises:
a serving circuitry, configured to serve the user equipment in the target cell in response to that the user equipment has switched from being served in the source cell by the source base station, and
a receiving port, configured to receive, from the user equipment, in association with the switch, an identifier of the source cell in the cellular communications network and a request for mobility report requesting the target base station to send a mobility report to the source base station or a management entity thereof, the mobility report reporting that a successful switch has taken place between the source cell and the target cell, thereby supporting updating of the neighbor cell relations based on the mobility report, wherein the request for mobility report comprises at least one parameter that was used by the user equipment for connecting to the target base station during the switch.

14. The target base station as claimed in claim 13, further comprising:
a sending port, configured to send, in response to the request for mobility report and by using the identifier of the source cell, the mobility report to the source base station or the management entity thereof.

* * * * *